3,497,561
DECOMPOSITION OF HYDROPEROXIDES
Abraham P. Gelbein, Plainfield, N.J., assignor to The Lummus Company, New York, N.Y., a corporation of Delaware
No Drawing. Filed June 8, 1967, Ser. No. 644,480
Int. Cl. C07c *45/16, 37/08, 27/00*
U.S. Cl. 260—606  4 Claims

ABSTRACT OF THE DISCLOSURE

A process for decomposing an aromatic hydroperoxide wherein the decomposition is effected in the presence of an inert solvent having a boiling point higher than the boiling point of the carbonyl decomposition product and the carbonyl decomposition product is continuously removed from the reaction mixture to maintain the reaction mixture essentially free of the carbonyl decomposition product. The process results in increased yields and essentially eliminates a decomposition other than the desired decomposition to a phenol and carbonyl compound.

---

This invention relates to organic hydroperoxides and more particularly to an improved process for decomposing an aromatic hydroperoxide to a phenol and a carbonyl compound, either a ketone or an aldehyde.

An aromatic hydroperoxide is known to decompose, in the presence of an acidic catalyst, to a phenol and a carbonyl compound, either a ketone or an aldehyde, depending on the particular hydroperoxide. The decomposition reaction, for example, for cumyl hydroperoxide, may be represented by the following equation:

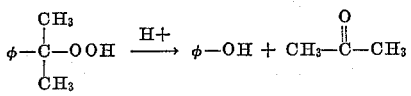

Although the above decomposition of cumyl hydroperoxide, a tertiary hydroperoxide, proceeds easily, the decomposition of primary and secondary hydroperoxides proceeds only with great difficulty and in very low yield. In many cases wherein a primary or a secondary hydroperoxide is employed as the starting material, the final decomposition reaction product contains little, if any, of the desired phenol and aldehyde.

Accordingly, an object of this invention is to provide a new and improved process for decomposing aromatic hydroperoxides to produce phenols and carbonyl compounds.

Another object of this invention is to provide a novel process for decomposing aromatic hydroperoxides to phenols and carbonyl compounds in high yields.

A further object of this invention is to provide an efficient process for decomposing aromatic hydroperoxides to phenols and carbonyl compounds which reduces by-product formation.

The objects of this invention are broadly accomplished by decomposing an aromatic hydroperoxide in the presence of an acid catalyst, i.e., a protonic acid or a Lewis acid, in a manner such that one of the products of the decomposition reaction is continuously separated from the reaction mixture to maintain the reaction mixture essentially free of the product. A particularly advantageous way of continuously separating a reaction product from the reaction mixture, is to effect the decomposition reaction in a distillation column wherein the carbonyl compound of the decompostiion reaction, is continuously withdrawn as overhead and the phenolic product of the decomposition reaction is withdrawn as bottoms. The term "aromatic hydroperoxides," as used herein, denotes the class of compounds characterized by an aromatic nucleus substituted with at least one hydroperoxymethyl group wherein the methyl group is unsubstituted or one or both of the hydrogens of the methyl group is substituted with an alkyl or aryl group. The aromatic nucleus may be free of substituents other than hydroperoxymethyl groups or may contain one or more or a mixture of alkyl, alkoxy, halogen, nitro, and cyano groups, or the like.

In a generally preferred embodiment, the aromatic hydroperoxide is introduced into the distillation column in an inert solvent having a boiling point higher than the boiling point of the carbonyl decomposition product and preferably also lower than the boiling point of the phenolic product. The temperature and pressure conditions maintained in the column are such that the carbonyl compound is continuously withdrawn as overhead. In a particularly preferred manner of operation, the column is operated at total reflux with respect to the inert solvent. The acid catalyst may be introduced with the feed to the column or may be separately introduced at another point in the column, e.g., into the reboiler.

The inert solvents which are employed in the process of the invention are those which do not react with and are not affected by, either the aromatic hydroperoxide, the decomposition products, or the catalyst, under the conditions of the decomposition reaction. The solvent generally has a boiling point of at least 80° C., preferably at least 100° C., to permit effective separation of the carbonyl compound at preferred decomposition reaction temperatures, i.e., a decomposition reaction temperature of at least 80° C., and preferably at least 100° C. As representative examples of such solvents there may be mentioned: the aromatic hydrocarbons such as, benzene, toluene, xylene, cumene, and the like. In general, the aromatic hydrocarbon, employed as the inert solvent, is the aromatic hydrocarbon from which the hydroperoxide was derived. It is to be understood, however, that the invention is not to be limited to the above particularly mentioned solvents, since the use of these solvents and other solvents should be readily apparent to those skilled in the art from the teachings of the invention.

The aromatic hydroperoxides which are decomposed in accordance with process of the invention may be represented by the following structural formula:

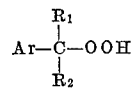

wherein $R_1$ and $R_2$ are either a hydrogen, an alkyl, preferably a lower alkyl, or an aryl group; and Ar may be either an aryl or a substituted aryl group, with the substituent groups generally being one or more or a mixture of alkyl, alkoxy, halogen, nitro, cyano, hydroperoxyalkyl and hydroperoxyaralkyl groups or the like. The aryl group may be either mononuclear, i.e., phenyl, or polynuclear, e.g., naphthyl, and the like.

As representative examples of aromatic hydroperoxides, there may be mentioned: benzyl hydroperoxide, ethylbenzene alpha-hydroperoxide, p-methyl benzyl hydroperoxide, butyl benzene alpha-hydroperoxide, propyl benzene hydroperoxide, p-diethylbenzene-di-alpha-hydroperoxide, p-xylene-α,α-dihydroperoxide, 1-ethylnaphthalene-alpha-hydroperoxide, 1-butyl-phenanthrene - alpha-hydroperoxide, diphenyl methane hydroperoxide, 2-phenyl-butane-2-hydroperoxide, p-methyl-α-cumyl hydroperoxide, cumyl hydroperoxide, and the corresponding alkyl, halogen, alkoxy, nitro and hydroperoxyalkyl, and hydroperoxyaralkyl ring substituted compounds.

The hydroperoxides employed in the process of this invention may be obtained from any of a wide variety of sources or may be synthesized as known in the art, e.g., passing an oxygen containing gas through an aralkyl compound in the presence of a radical initiator, e.g., a peroxide, to produce the corresponding aralkyl hydroperoxide. Thus, benzyl hydroperoxide may be produced by passing oxygen through toluene at a temperature of 125° C., in the presence of a peroxide, such as di-t-butyl peroxide.

The protonic and Lewis acid catalysts used for effecting decomposition of the aromatic hydroperoxides are generally known in the art and from among these known catalysts there may be mentioned: sulfuric acid, hydrochloric acid, benzylsulfonic acid, tolylsulfonic acid, phosphoric acid, trichloroacetic acid, stannic chloride, zinc chloride, ferric chloride, aluminum chloride, boron trifluoride, and hydrogen fluoride.

Catalysts which have been found to be particularly effective for the decomposition of aromatic hydroperoxides are gaseous oxides of sulfur; i.e., sulfur dioxide and trioxide. In accordance with the process of the invention, sulfur trioxide effects decomposition of aromatic hydroperoxides efficiently and essentially instantaneously and may be added to the reaction mixture either in pure form or in admixture with an inert gas, such as, nitrogen.

Numerous modifications and variations of the present invention are possible without departing from the scope thereof, so long as a product of the decomposition reaction in continuously separated from the reaction mixture. Accordingly, although the hereinabove described separation procedure is particularly advantageous, the scope of the invention is not to be limited thereby and numerous modifications of the invention should be apparent to those skilled in the art from the teachings contained herein.

The following examples are illustrative of the invention but the scope of the invention is not to be limited thereby:

EXAMPLE 1 (CONTROL)

5 parts of 10% (by weight) benzyl hydroperoxide in toluene was added to 50 parts of refluxing toluene. The mixture was saturated with $SO_2$, over a 30-minute period and heating was continued for an additional 30 minutes. After the initial addition of the benzyl hydroperoxide, the reaction mixture developed a red color but subsequently sludge was observed to form. An analysis of the final reaction mixture by gas-liquid chromatography and infrared spectrophotometry showed that there was substantially no free phenol present.

EXAMPLE 2

50 parts of 10% (by weight) benzyl hydroperoxide in toluene and small amounts of $SO_2$ were added to 50 parts of rapidly distilling toluene over a 15-minute period. The formaldehyde produced was separated from the toluene as a gaseous overhead product. The underflow reaction mixture, which was comprised essentially of phenol dissolved in toluene, was substantially free of sludge.

EXAMPLE 3

50 parts of 10% (by weight) benzyl hydroperoxide in toluene were added to 50 parts of rapidly distilling toluene over a 15-minute period. Cocurrently $SO_3$ diluted with $N_2$ was added to the system. The formaldehyde produced was separated from the toluene as a gaseous overhead product. The underflow reaction mixture, which was comprised essentially of phenol dissolved in toluene, was substantially free of sludge.

EXAMPLE 4

α,α-diphenyl methane hydroperoxide in diphenyl methane was reacted in a manner similar to Example 2. Benzaldehyde was produced and taken overhead, and essentially pure phenol dissolved in diphenyl methane was taken as bottoms product.

EXAMPLE 5

Cumene-α-hydroperoxide in cumene was reacted in a manner similar to Example 2. Acetone was produced and taken overhead, and especially pure phenol dissolved in cumene was taken as bottoms product.

The process of this invention is extremely effective for decomposing the aromatic hydroperoxides, and in particular, primary and secondary aromatic hydroperoxides. Although the scope of the invention is not to be limited to any theoretical reasoning, it is believed that the decomposition products of primary and secondary aromatic hydroperoxides, phenols and aldehydes, react under the decomposition reaction conditions to produce a sludge comprised of polymeric products. Accordingly, the continuous separation of the reaction products essentially eliminates sludge formation.

In addition, the decomposition of aromatic hydroperoxides may result in a cleavage other than the desired cleavage to produce aryl alkyl ketones, aralkyl alcohols, aliphatic alcohols, etc., and it has been found that the process of this invention essentially eliminates the production of such products. Although again the invention is not to be bound by any theoretical reasoning, it is believed that the process of the invention provides a high temperature-short reaction time profile which favors the desired cleavage.

Numerous modifications and variations of the invention are possible in the light of the above teachings. It is, therefore, to be understood that within the scope of the appended claims the invention may be practiced otherwise than as particularly described.

What is claimed is:

1. A process for decomposing benzyl hydroperoxide to phenol and formaldehyde comprising:
   (a) heating the benzyl hydroperoxide to above the decomposition temperature in the presence of an acid catalyst; and
   (b) continuously distilling the formaldehyde reaction product from the reaction mixture to maintain the reaction mixture essentially free of formaldehyde.

2. The process as defined in claim 1 wherein the acid catalyst is sulfur trioxide.

3. The process as defined in claim 1 wherein the benzyl hydroperoxide is heated in a continuous distillation zone in the presence of an inert solvent, the formaldehyde being recovered as overhead from the distillation zone and the phenol as bottoms from the distillation zone.

4. The process as defined in claim 3 wherein the distillation zone is operated at total reflux with respect to the inert solvent.

References Cited

UNITED STATES PATENTS

| | | | |
|---|---|---|---|
| 2,626,281 | 1/1953 | Joris | 260—593 |
| 2,663,735 | 12/1953 | Filar | 260—593 |
| 2,748,172 | 5/1956 | Rodgers | 260—593 |
| 2,757,209 | 7/1956 | Joris | 260—593 |
| 2,761,877 | 9/1956 | Mosnier | 260—593 |
| 3,305,590 | 2/1967 | Pollitzer et al. | |
| 2,608,467 | 8/1952 | Lewis | 23—179 |

BERNARD HELFIN, Primary Examiner

U.S. Cl. X.R.

260—591, 593, 599, 601, 621